W. A. GORMAN.
LAWN SCARIFIER.
APPLICATION FILED DEC. 29, 1914.
1,172,981.
Patented Feb. 22, 1916.
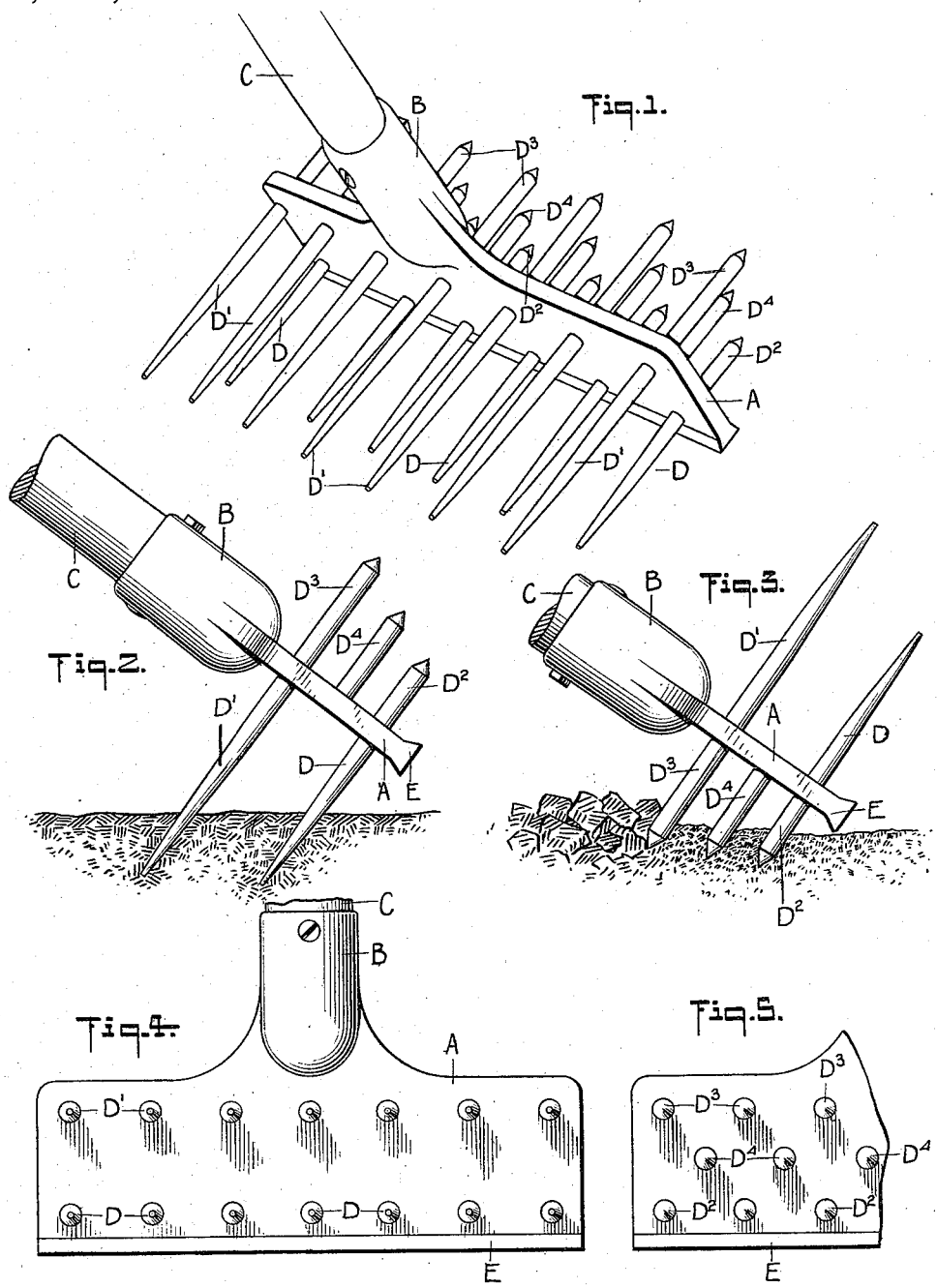
WITNESSES
INVENTOR
William A. Gorman
BY
ATTORNEYS

UNITED STATES PATENT OFFICE.

WILLIAM A. GORMAN, OF NEW YORK, N. Y.

LAWN-SCARIFIER.

1,172,981.   Specification of Letters Patent.   Patented Feb. 22, 1916.

Application filed December 29, 1914. Serial No. 879,475.

*To all whom it may concern:*

Be it known that I, WILLIAM A. GORMAN, a citizen of the United States, and a resident of the city of New York, borough of Brooklyn, in the county of Kings and State of New York, have invented a new and Improved Lawn-Scarifier, of which the following is a full, clear, and exact description.

The invention relates to agricultural implements and its object is to provide a new and improved lawn scarifier more especially designed for quickly and thoroughly preparing bare patches of lawn for reseeding.

In order to accomplish the desired result, use is made of a handled body and teeth carried by and projecting on opposite faces of the said body, the teeth on one face being longer than the teeth on the other face to allow of breaking the ground with the longer teeth and to subsequently reduce the broken ground by the shorter teeth on reversing the implement.

A practical embodiment of the invention is represented in the accompanying drawings forming a part of this specification, in which similar characters of reference indicate corresponding parts in all the views.

Figure 1 is a perspective view of the lawn scarifier; Fig. 2 is a side elevation of the same applied for breaking the ground; Fig. 3 is a similar view of the same in reversed position for reducing the broken ground; Fig. 4 is an inverted view of the implement with the longer teeth upward; and Fig. 5 is a like view of a portion of the body with the shorter teeth upward.

The body A of the implement is preferably in the form of a plate provided at the rear edge with an integral socket B in which is fastened a suitable handle C. In the body A are secured front and rear rows of teeth D and D' of tapering shape, of which the teeth D of the front row are shorter than the teeth D' in the rear row, the difference being such that when the implement is used and the points of the teeth D and D' strike the ground then the points are approximately in the same horizontal plane with the handle C and the plate A extending at an acute angle to the ground (see Fig. 2). The teeth D and D' are used for breaking up the ground into lumps by using the implement the same as a hoe, and in order to break up the lumps the implement is reversed and use is made of rows of teeth $D^2$, $D^3$ and $D^4$ on the opposite faces of the plate A. The teeth $D^2$, $D^3$ and $D^4$ are preferably cylindrical with short stubby points, and the teeth $D^2$, $D^3$ are preferably continuations of the teeth D, D'. In practice, the teeth D, $D^2$, D', $D^3$ and $D^4$ are preferably cast in the body A, but they may be otherwise fastened therein without deviating from my invention. The teeth $D^2$, $D^4$ and $D^3$ are of different length but are comparatively short relative to the teeth D and D', and the points thereof are approximately in the same horizontal plane at the time the implement is used for reducing the broken ground, with the handle C and plate A extending at an acute angle to the ground, as shown in Fig. 3. By providing a large number of teeth $D^2$, $D^4$ and $D^3$ lumps are quickly reduced by repeatedly striking the same with the said teeth $D^2$, $D^4$ and $D^3$.

From the foregoing it will be seen that the implement can be readily used for breaking up the ground of bare patches or stretches of lawn, and the broken up ground, on reversing the implement, can then be readily reduced for sowing the grass seed in the ground. Thus with the use of a single implement the lawn can be readily repaired in a very simple and effective manner.

Having thus described my invention, I claim as new and desire to secure by Letters Patent:

1. An agricultural implement of the character described, comprising a handled body having rows of spike-like teeth projecting from each side, one side having a greater number of rows than the other, and the teeth on one side being longer than the teeth on the other side.

2. An agricultural implement of the character described, comprising a handled body having rows of spike-like teeth projecting from each side, one side having a greater number of rows and whose teeth are shorter than the teeth on the other side, the teeth of the forward row on each side being shorter than the rear row.

3. An agricultural implement of the character described, comprising a plate provided with a socket, a handle in the said socket, and rows of spike-like teeth carried by the said plate and extending on opposite faces of the plate in transverse rows, the teeth of the forward row on each side being shorter than the teeth of the rear row, whereby the points of the teeth on both sides of the plate will be in a horizontal plane at the time the teeth enter the ground and the handle extends at an acute angle to the ground.

4. An agricultural implement of the character described, comprising a flat plate having a socket and provided with two rows of tapering teeth projecting from one face, and three rows of teeth having stubby points projecting from the other face, the teeth of the forward row of teeth on each face being shorter than the rear row.

In testimony whereof I have signed my name to this specification in the presence of two subscribing witnesses.

WILLIAM A. GORMAN.

Witnesses:
 THEO. G. HOSTER,
 PHILIP D. ROLLHAUS.

Copies of this patent may be obtained for five cents each, by addressing the "Commissioner of Patents, Washington, D. C."